United States Patent [19]
Barr et al.

[11] Patent Number: 5,963,507
[45] Date of Patent: Oct. 5, 1999

[54] METHOD FOR IMPROVING THE ACCURACY OF OCEAN BOTTOM REFLECTIVITY ESTIMATIONS USING THE INVERSE BACKUS FILTER

[75] Inventors: Frederick J. Barr, Houston; Josef Paffenholz, Missouri City, both of Tex.

[73] Assignee: Western Atlas International, Inc., Houston, Tex.

[21] Appl. No.: 09/078,293

[22] Filed: May 13, 1998

[51] Int. Cl.[6] .................................................. G01V 1/38
[52] U.S. Cl. ............................... 367/15; 367/46; 367/24; 367/21; 367/15; 367/38; 181/110
[58] Field of Search .............................. 367/46, 24, 21, 367/15, 38; 181/110

[56] References Cited

U.S. PATENT DOCUMENTS

| | | |
|---|---|---|
| 5,396,472 | 3/1995 | Paffenholz .................................. 367/24 |
| 5,524,100 | 6/1996 | Paffenholz .................................. 367/24 |

*Primary Examiner*—John Barlow
*Assistant Examiner*—Anthony Jolly
*Attorney, Agent, or Firm*—Gerald E. Lester

[57] ABSTRACT

A method for determining ocean bottom reflectivities from dual sensor seismic data, whereby a first time windowed pressure signal and a first windowed velocity signal are summed to generate a first summed signal, and a second time windowed pressure signal and a second time windowed velocity signal are summed to generate a second summed signal. The first summed signal and the second summed signal are transformed from the time domain to the frequency domain to generate a first transformed sum and a second transformed sum, respectively. A value $\tilde{R}$ for said ocean bottom reflectivity is selected and used to calculate an inverse Backus filter $(1+\tilde{R}z)^2$, where Z is the Z-transform of the two-way travel time delay filter. The first transformed sum and the second transformed sum are multiplied by the inverse Backus filter to generate a first filtered sum and a second filtered sum, respectively. A cross spectrum is calculated from the first filtered sum and the second filtered sum to generate a trial cross spectrum. An optimization algorithm is applied to the trial cross spectrum to determine the ocean bottom reflectivity.

14 Claims, 3 Drawing Sheets

METHOD FOR IMPROVING THE ACCURACY OF OCEAN BOTTOM REFLECTIVITY ESTIMATIONS USING THE INVERSE BACKUS FILTER

BACKGROUND OF THE INVENTION

1. Field of the Invention

The present invention relates generally to marine seismic prospecting and, more particularly, to a method for using production dual sensor seismic data to determine ocean bottom reflectivity in the presence of random noise.

2. Description of the Related Art

Marine seismic prospecting is a method for taking seismic profiles of underwater subterranean land formations. In marine seismic prospecting, a seismic survey ship is equipped with at least one energy source and at least one receiver. An energy source is designed to produce compressional waves that propagate through the water and into the subterranean formations. As the compressional waves propagate through the subterranean formations, they strike interfaces between formations, commonly referred to as strata, and reflect back through the earth and water to a receiver. The receiver is designed to detect the reflected compressional waves. The receiver typically converts the detected waves into electrical signals which are later processed into an image that provides information about the structure of the subterranean formations.

Different energy sources may be used to generate acoustic waves in marine applications. Presently, one of the most common marine energy sources is an air gun that discharges air under very high pressure into the water. The discharged air forms an energy pulse which propagates through the water and the underlying subterranean formations. Another marine energy source frequently used is a marine vibrator. Marine vibrators typically include a pneumatic or hydraulic actuator that causes an acoustic piston to vibrate at a range of selected frequencies.

Similarly, different receivers may be used to detect reflected acoustic waves. The receivers most commonly used in marine seismic prospecting are hydrophones. Hydrophones detect and convert pressure waves into electrical signals that are used for analog or digital processing. The most common type of hydrophone includes a piezoelectric element which converts pressure into electrical signals. Another receiver sometimes used in a marine setting is a geophone. Geophones detect particle velocity. Geophones are typically used in land operations where the geophones are anchored to the ground to maintain correspondence of geophone motion to ground motion. In marine applications, however, anchoring the geophones is difficult. Typically, therefore, a gimbal mechanism is used to orient the geophone vertically for proper operation. Alternatively, accelerometers or displacement detectors may be used.

Hydrophones are typically mounted on a long streamer which is towed behind the survey ship at a depth of tens of feet. Alternatively, marine seismic prospecting may combine different types of receivers. For instance, in dual sensor ocean bottom cable seismic recording, a combination of hydrophones and geophones are deployed on the marine bottom. Typically, miles of bottom cable are deployed in a planned pattern such as a single line or a plurality of substantially parallel lines.

The use of ocean bottom cables is particularly effective in obtaining full three dimensional coverage in areas too shallow or too congested with obstacles for gathering seismic data with a towed streamer. While the ocean bottom cable technique allows access to areas denied to the towed streamer method, an additional, unwanted "ghost" reflection from the air water interface, along with subsequent reverberations, occurs for each primary reflection wave. The time delay between the primary reflection signal and the ghost reflection signal is greater with the ocean bottom cable method than with the towed streamer method because the detectors are farther removed from the air-water interface in the ocean bottom cable method, except in shallow water.

Two basic approaches have been proposed for eliminating the ghost reflection. The first approach involves recording signals from detectors at different depths and then performing a wavefield separation. The second approach utilizes co-located pairs of pressure and velocity detectors, as in, for example, U.S. Pat. No. 2,757,356, "Method and Apparatus for Canceling Reverberations in Water Layers", issued to Haggerty. This second approach capitalizes upon the fact that pressure and velocity detectors generate signals which are the same polarity for upward travelling waves but are of opposite polarity for downward travelling waves, that is, the ghost reflections. This indicates that the two signals can be properly summed to eliminate the unwanted reverberations associated with each reflection. In the frequency domain, this relationship expresses itself in the complimentary amplitude spectra of the two sensors. When the signals are properly summed, a smooth amplitude spectrum results.

U.S. Pat. No. 4,979,150, issued to present co-inventor Barr, assigned to the assignee of the present invention, and entitled "Method for Attenuation of Water-Column Reverberations" describes a dual sensor ocean bottom cable method for attenuating the unwanted water column reverberations associated with each reflection signal in the seismic data by combining the pressure and velocity signals recorded at each receiver station. The pressure and velocity signals are scaled and summed, with a scale factor dependent upon the acoustic impedance of the water and the earth material of the ocean bottom. Proper combination of the pressure and velocity signals, in order to remove the component of the signal representing energy which is trapped in the water layer, can only be performed after scaling the velocity signal by a scale factor S given by $$S = \frac{(1+R)}{(1-R)},$$

where R is the ocean bottom reflectivity. Thus the scale factor requires determining the ocean bottom reflectivity, which depends upon the acoustic impedance of the bottom material.

In the prior art, a calibration survey has been used to estimate the ocean bottom reflectivity R. In the dual sensor operations of U.S. Pat. No. 4,979,150 described above, an estimate of the ocean bottom reflectivity is made by collecting separate reference information, generated by shooting a small seismic source directly over the receivers. The collection of this survey data requires additional time and cost beyond the data acquisition phase of the survey.

U.S. Pat. No. 5,365,492, issued to Dragoset, Jr., assigned to the assignee of the present invention, and entitled "Method for Reverberation Suppression", describes a dual sensor ocean bottom cable method for suppressing water column reverberations directly from the production dual sensor seismic data rather than from additional calibration data. Additionally, the method works in the presence of random noise in the velocity signal. The noise is adaptively estimated and subtracted from the velocity signal. The velocity and pressure signals are summed with trial scale factors and the sums are autocorrelated. A varimax function is computed for each autocorrelation and used to select the best scale factor.

U.S. Pat. Nos. 5,396,472 and 5,524,100, both issued to present co-inventor Paffenholz, assigned to the assignee of the present invention, and both entitled "Method for Deriving Water Bottom Reflectivity in Dual Sensor Seismic Surveys", describe a dual sensor ocean bottom cable method for estimating the ocean bottom reflectivity directly from the production data rather than from calibration data, using inverse Backus filters. In this method, time windowed common receiver station hydrophone and geophone traces are added together after correcting for any differences in transduction constants. Inverse Backus filters are then applied to these summed traces with a range of ocean bottom reflection values. The estimated reflectivity value is that which minimizes the energy in the resulting filtered traces, because it has done the best job of eliminating the undesired water column reverberations. An optimization procedure determines which trial value for ocean bottom reflectivity minimizes the spectral power. Improved attenuation of water-column reverberations over previous methods results.

U.S. patent application Ser. No. 08/871,505, filed Jun 9, 1997 by present co-inventors Barr and Paffenholz along with Chambers, assigned to the assignee of the present invention, and entitled "Method for Deriving Surface Consistent Reflectivity Map from Dual Sensor Seismic Data", describes a method which allows the determination of ocean bottom reflectivities at all the source and receiver locations. Since the acoustic impedance of the bottom material, and hence the ocean bottom reflectivity, can vary among different source and receiver locations, the scale factor can vary at different locations too. A "surface consistent" map of ocean bottom reflectivities gives the different values at different locations.

The presence of random noise on the summed dual sensor traces causes inaccuracies in the estimates of ocean bottom reflectivity. None of the above mentioned references both utilize the superior reverberation attenuation capabilities of the inverse Backus filter method and handle the problem of random noise in the seismic data.

SUMMARY OF THE INVENTION

The present invention is a method for determining ocean bottom reflectivities from dual sensor seismic data. A first time windowed pressure signal and a first windowed velocity signal are summed to generate a first summed signal. Similarly, a second time windowed pressure signal and a second time windowed velocity signal are summed to generate a second summed signal. The first summed signal and the second summed signal are transformed from the time domain to the frequency domain to generate a first transformed sum and a second transformed sum, respectively. A trial value $\tilde{R}$ for said ocean bottom reflectivity is selected and used to calculate an trial inverse Backus filter $(1+\tilde{R})^2$, where Z is the Z-transform of the two-way travel time delay filter. The first transformed sum and the second transformed sum are multiplied by the trial inverse Backus filter to generate a first filtered sum and a second filtered sum, respectively. A cross spectrum is calculated from the first filtered sum and the second filtered sum to generate a trial cross spectrum. An optimization algorithm is applied to the trial cross spectrum to determine the ocean bottom reflectivity.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

Figure 1:
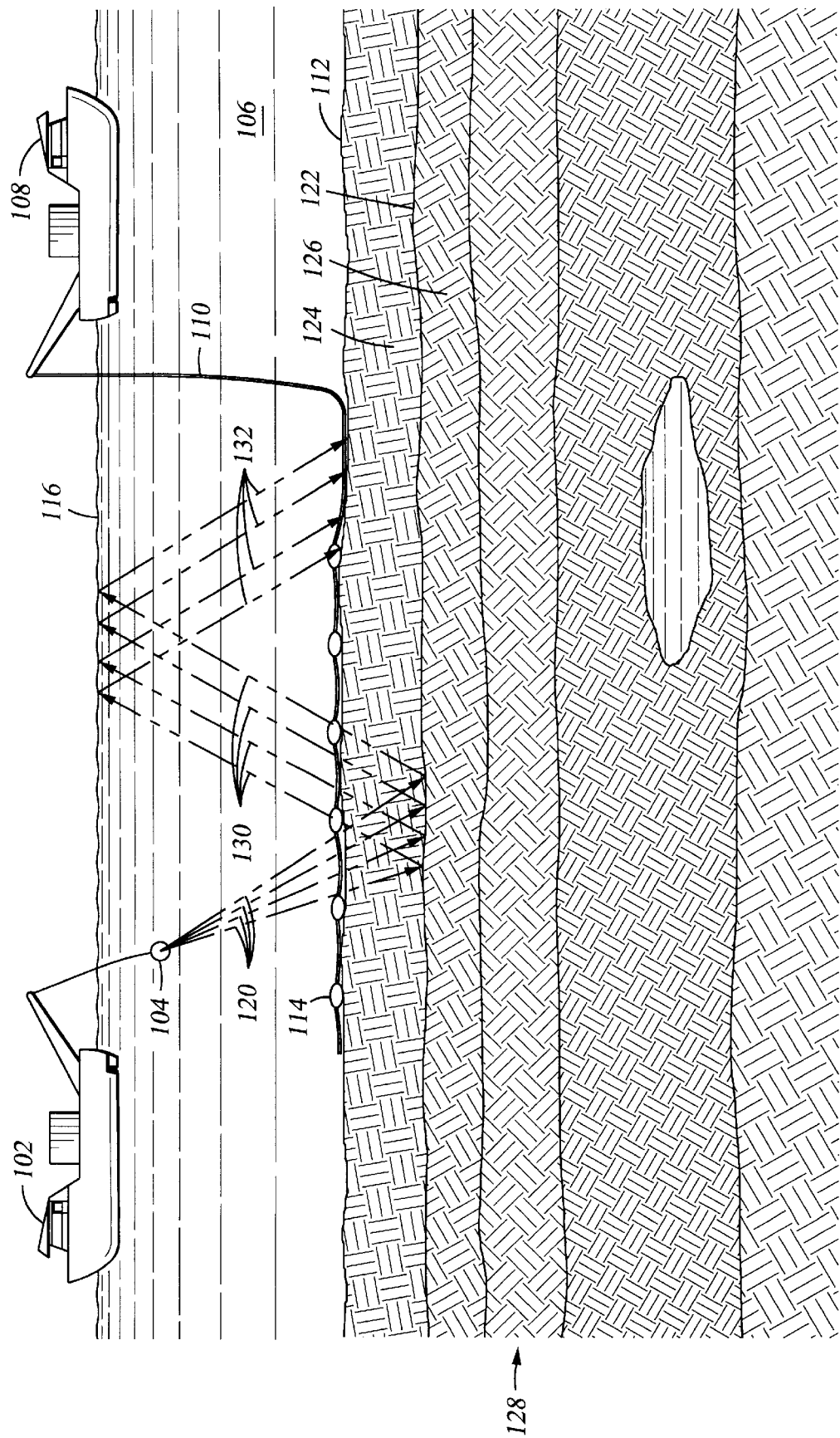
FIG. 1 is an illustration of apparatus used in a bottom cable operation.

FIG. 1 illustrates a preferred marine seismic survey system, generally designated by 100. The system 100 includes a seismic survey ship 102 that is adapted for towing a seismic energy source 104 or plurality of such seismic sources through a body of water 106. The seismic energy source 104 is an acoustic energy source or an array of such acoustic sources. An acoustic energy source 104 preferred for use with the system 100 is a compressed air gun, constructed and operated in a manner conventional in the art. The system 100 also includes a receiving ship 108 in the body of water 106. The receiving ship 108 deploys one or more cables 110 on the marine bottom 112, and receives signals from the cables 110. The cables 110 carry at least one receiver 114 each, but normally include a plurality of receivers 114.

The receivers 114 include co-located hydrophones for detecting water pressure and geophones for detecting water bottom particle velocity. More particularly, the hydrophones and geophones on the cables 110 are arranged so that each hydrophone has at least one gimballed geophone positioned next to it, when the cables 110 are deployed on the marine bottom 112. Electrical signals are sent to a recording system on the receiving ship 108 from the hydrophones and geophones. The survey ship 102 fires the source 104 at predetermined locations while the signals from the hydrophones and geophones are recorded. The signals are recorded by a multi-channel seismic recording system (not shown) that selectively amplifies, conditions and records time-varying electrical signals onto magnetic tape or some other storage medium. Advantageously, the seismic recording system also digitizes the received signals to facilitate signal analysis. Those skilled in the art will recognize that any one of a variety of seismic recording systems can be used.

According to a preferred practice, the cables 110 and their associated receivers 114 carrying hydrophones and geophones are positioned on the marine bottom 112. Production shooting takes place with the survey ship 102 moving at a constant speed along a pattern, such as a set of parallel lines, or swath, typically perpendicular to the cables 110. After the survey ship 102 completes the swath, the receiving ship 108 or other suitable ship retrieves the cables 110 and re-deploys the cables 110 in another pattern, such as lines spaced from, but parallel to, the previous cable locations. Once the cables 110 are re-deployed, the survey ship 102 shoots another pattern.

During data collection, seismic waves generated by the source 104 travel downwardly, as indicated by the rays 120. These primary waves are reflected off of interfaces between strata, such as the interface 122 between strata 124 and 126, in the subterranean earth formation 128. The reflected waves travel upwardly, as illustrated by the rays 130. The hydrophones and geophones which comprise the receivers 114 detect the reflected waves 130. The receivers 114 generate electrical signals representative of pressure and particle velocity changes in the seismic wave field, and transmit these generated electrical signals back to the survey ship 108 via the cable 110 or some other transmittal means, such as radio. The seismic recording system within the survey ship 108 records these electrical signals so that they can be subsequently processed to map the subterranean earth formation 128.

The receivers 114 detect both reflected waves of interest and unwanted reverberated waves which are noise. Reverberated waves are seismic waves which reflect off the water-air interface at the surface 116 of the water one or more times before finally traveling downwardly in the water 106 to impinge on the receivers 114. An example of reverberated waves is illustrated by the rays 132 in FIG. 1. Peg-leg reverberation waves contain at least one reflection from an interface 122 between strata in addition to the reverberations between the water surface 116 and the marine bottom 112.

The object of the present invention is to reduce the size of the inaccuracies in the summed dual sensor data caused by random noise in the original recorded seismic data. Then, when inverse Backus filters are applied to all of the summed dual sensor data, more effective water column reverberation attenuation will result. The method of the present invention depends upon whether the random noise changes with time or not. In the former case, when the random noise does not change significantly over time, the method of the preferred embodiment uses the Fourier transform of each trace in two separate time windows. The first time window is placed where both signal and noise exist. For example, this first time window may be from 1000 to 2000 milliseconds after the detected first breaks. The second time widow is placed where the random noise dominates the seismic trace values. For example, this second time window may be from 2000 to 3000 milliseconds after the detected first breaks.

Writing the frequency domain representation for the first time window, $$F_1 = S + N_1 \quad (1)$$

where $F_1$=Fourier transform of signal in first time window,

S=summed hydrophone and geophone signal, and $N_1$=random noise in the first time window.

From U.S. Pat. No. 5,396,472, we know that S can be expressed as $$S = \frac{1}{(1+RZ)^2}\beta \quad (2)$$

where

R=ocean bottom reflectivity,

Z=Z-transform of the two-way travel time delay operator, and

β=desired reflections, without water column reverberations,

The delay operator Z can be written as $$Z = \cos(\omega t) - i\sin(\omega t),$$

where

X=radial frequency, and t=two-way travel time from ocean bottom to surface and back.

Substituting Eq. (2) into Eq. (1) yields $$F_1 = \frac{1}{(1+RZ)^2}\beta + N_1 \quad (3)$$

In the method of U.S. Pat. Nos. 5,386,472 and 5,524,100, trial inverse Backus filters $(1+\tilde{R})^2$ are applied to Eq. (3), searching for that trial value of $\tilde{R}$ which yields the least amount of energy in the remaining spectrum. Multiplying each term of Eq.(3) by the trial inverse Backus filter yields $$F_1(1+\tilde{R}Z)^2 = \frac{(1+\tilde{R}Z)^2}{(1+RZ)^2}\beta + (1+\tilde{R}Z)^2 N_1 \quad (4)$$

where $\tilde{R}$=trial value of ocean bottom reflectivity.

If $N_1$ were equal to zero, then the minimum spectral energy occurs when the value of $\tilde{R}$ equals R, because all the reverberations are eliminated and only the desired reflection series β remains. However, if there is random noise $N_1$, then the second term in Eq. (4) can cause minimum energy to occur at some other value of $\tilde{R}$ not equal to R.

The preferred method of the present invention includes the step of taking the Fourier transform of a second time window of equal length deep in each trace where the random noise dominates the trace values, that is, where there is essentially no desired signal. Thus the frequency domain representation for the second time window is $$F_2 = N_2 \quad (5)$$

where $F_2$=Fourier transform of signal in second time window, and $N_2$=random noise in second time window.

The trial inverse Backus filters are also applied to the data in this second time window, multiplying each term in Eq. (5). The expression for this inverse Backus filtered spectrum in the second time window then is $$F_2(1+\tilde{R}Z)^2 = (1+\tilde{R}Z)^2 N_2 \quad (6)$$

The cross spectrum of each time window can be formed by multiplying each spectrum by its complex conjugate in Eqs. (4) and (6), respectively, yielding $$F_1 F_1^* (1+\tilde{R}Z)^2 \{(1+\tilde{R}Z)^2\}^* = \frac{(1+\tilde{R}Z)^2}{(1+RZ)^2} \left\{ \frac{(1+\tilde{R}Z)^2}{(1+RZ)^2} \right\}^* \beta\beta^* + \quad (7)$$

$$\frac{(1+\tilde{R}Z)^2 \{(1+\tilde{R}Z)^2\}^*}{(1+RZ)^2} \beta N_1^* +$$

$$\frac{(1+\tilde{R}Z)^2 \{(1+\tilde{R}Z)^2\}^*}{\{(1+RZ)^2\}^*} \beta^* N_1 +$$

$$(1+\tilde{R}Z)^2 \{(1+\tilde{R}Z)^2\}^* N_1 N_1^*$$

and $$F_2 F_2^* (1+\tilde{R}Z)^2 \{(1+\tilde{R}Z)^2\}^* = (1+\tilde{R}Z)^2 \{(1+\tilde{R}Z)^2\}^* N_2 N_2^* \quad (8)$$

Both of the cross spectra in Eqs. (7) and (8) have zero phase, by definition. Thus, in complex number form, the imaginary component of each spectral component is zero.

The last term of Eq. (7) represents, in the frequency domain, the autocorrelation function of the trial Backus filters multiplied by the autocorrelation function of the noise in the shallow first time window. Note that if the statistical properties of the noise in the deep second time window remain the same as that in the shallow first time window, as assumed, then the cross spectrum in Eq. (8) is identical to the last term in Eq. (7).

Therefore, subtract the cross spectrum of Eq. (8) from the cross spectrum of Eq. (7), leaving only the first three terms of Eq. (7):

$$(F_1 F_1^* - F_2 F_2^*)(1+\tilde{R}Z)^2 \{(1+\tilde{R}Z)^2\}^* = \frac{(1+\tilde{R}Z)^2}{(1+RZ)^2} \left\{ \frac{(1+\tilde{R}Z)^2}{(1+RZ)^2} \right\}^* \beta\beta^* + \quad (9)$$

$$\frac{(1+\tilde{R}Z)^2 \{(1+\tilde{R}Z)^2\}^*}{(1+RZ)^2} \beta N_1^* +$$

$$\frac{(1+\tilde{R}Z)^2 \{(1+\tilde{R}Z)^2\}^*}{\{(1+RZ)^2\}^*} \beta^* N_1$$

It is important to note that although the spectral components in Eqs. (7) and (8) are all real positive numbers, the spectral components in Eq. (9), the difference of Eqs. (7) and (8), are real numbers, but not necessarily positive numbers.

Thus, the total energy in Eq. (9) is measured by algebraically summing the spectral components. The algebraic signs of these spectral components must be honored for the method to succeed. The value of $\tilde{R}$ that yields the smallest energy is the best estimate of R. Because the possible solution space is limited to ocean bottom reflectivity values between −0.9 and +0.9, an exhaustive search is feasible. In an exhaustive search, a series of values is selected which systematically covers the range of the possible solution space, such as values covering the range in equally-spaced increments.

Figure 2:
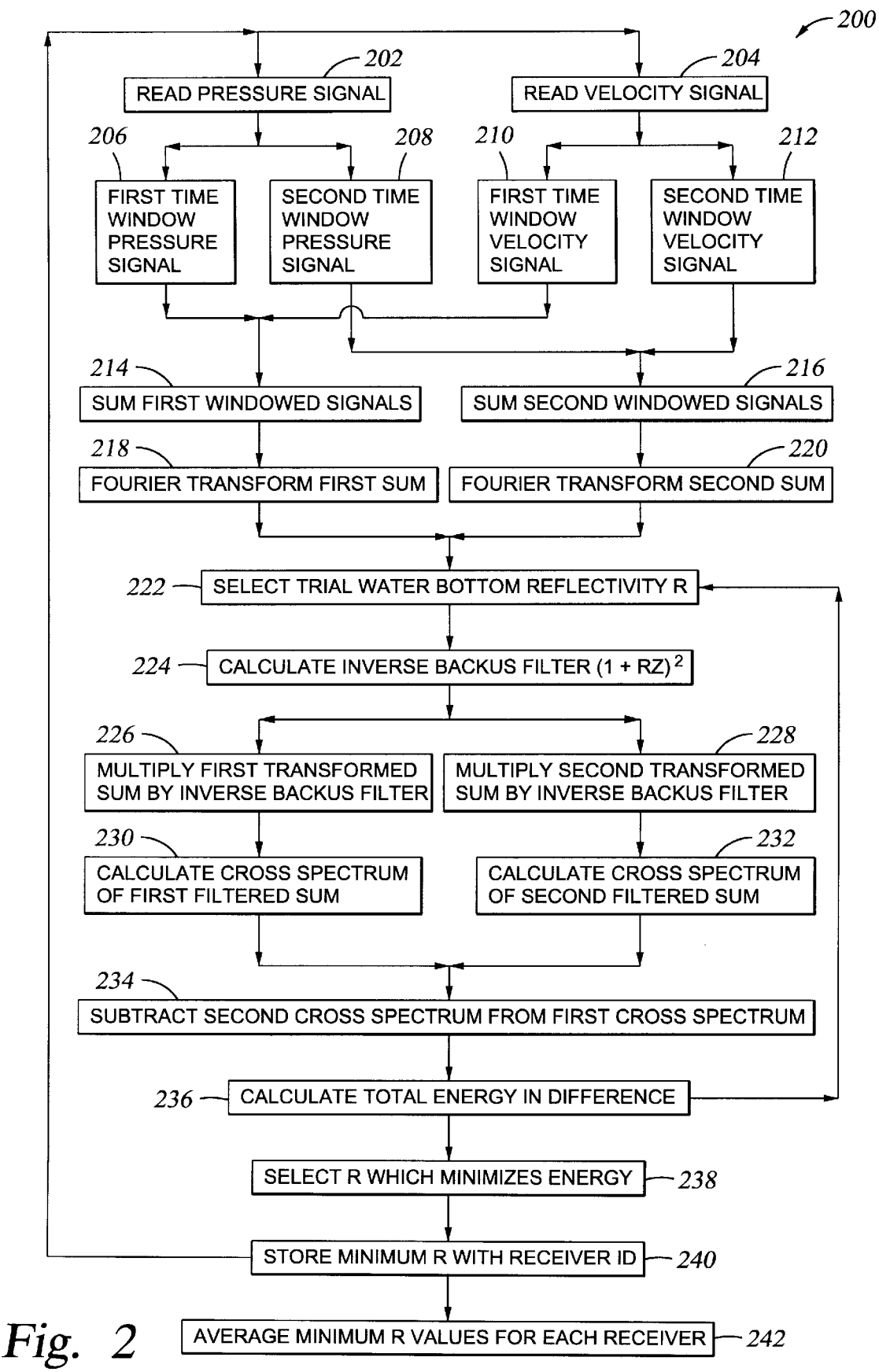
FIG. 2 is a flow diagram of the preferred implementation of the present invention in the presence of uniform random noise.

FIG. 2 illustrates a flow diagram which represents the preferred method for determining ocean bottom reflectivity in the presence of random noise which does not change substantially over time. The preferred method illustrated is generally designated by 200. First, in blocks 202 and 204, the pressure signal as a hydrophone data trace and the velocity signal as a geophone data trace, from co-located receivers, are read. Next in blocks 206 and 210, a first time window is applied to both the pressure signal from block 202 and the velocity signal from block 204, generating a first windowed pressure signal and a first windowed velocity signal, respectively. Preferably, the first time window is selected as a period during which both signal and random noise exist. For example, the first time window may be, counting from the first break appearing on each signal, in the range of 1000 to 2000 milliseconds. Next in blocks 208 and 212, a second time window is applied to both the pressure signal from block 202 and the velocity signal from block 204, generating a second windowed pressure signal and a second windowed velocity signal, respectively. Preferably, the second time window is selected as a period in which random noise dominates the signal. For example, the second time window may be, counting from the first break appearing on each signal, in the range of 2000 to 3000 milliseconds. Next, in block 214, the first windowed pressure signal from block 206 and the first windowed velocity signal from block 210 are summed to generate a first summed signal. Similarly, in block 216, the second windowed pressure signal from block 208 and the second windowed velocity signal from block 212 are summed to generate a second summed signal. Then, in block 218, the first summed signal from block 214 is transformed from the time domain to the frequency domain, preferably by applying a Fourier transform to the first summed signal, generating a first transformed signal. Similarly, in block 220, the second summed signal from block 216 is transformed from the time domain to the frequency domain, preferably by applying a Fourier transform to the second summed signal, generating a second transformed signal.

Next, in block 222 a trial value $\tilde{R}$ for ocean bottom reflectivity is selected, preferably from a series of values defining an exhaustive search of the possible range of reflectivity values. In block 224, the trial inverse Backus filter $(1+Z\tilde{R})^2$ of Eq. (3) is computed for the selected trial ocean bottom reflectivity value $\tilde{R}$ from block 222, and for Z, the Z transform of the delay operator for the two-way travel time in the water layer. In block 226, the first transformed signal from block 218 is multiplied by the trial inverse Backus filter from block 224, generating a first filtered signal. Similarly, in block 228, the second transformed signal from block 220 is multiplied by the trial inverse Backus filter from block 224, generating a second filtered signal. Next, in blocks 230 and 232, the cross spectrums of the first filtered sum from block 226 and the second filtered sum from block 228, respectively, are calculated. In block 234, the second cross spectrum from block 232 is subtracted from the first cross spectrum from block 230.

Next, an optimization algorithm is applied to the difference of the cross spectrums from block 234 to determine the best value of $\tilde{R}$. A preferred method of optimization is to minimize the total energy of the difference of the cross spectrums from block 234. In block 236, the total energy in the difference of the cross spectrums from block 234 is calculated by algebraically summing the spectral components of the difference of the cross spectrums. In block 238, the value of $\tilde{R}$ is determined which minimizes the total energy in the difference of the cross spectrums from block 234. In block 240, the value of $\tilde{R}$ from block 238 is stored along with the identification of the receiver. Then the program logic loops back to read the traces for the next receiver. Finally, in block 242, after traces for all the receiver locations are processed, the values of ocean bottom reflectivities $\tilde{R}$ are averaged.

When the random noise does change significantly over time, an alternative embodiment must be used. The method of the alternative embodiment uses the Fourier transform of two traces within a family of traces, for example 50 traces, for each value of R, time-windowed. For example, the time window may be from 1000 to 2000 milliseconds after the detected first breaks. These two traces represent a pair of common receiver gather traces from consecutive shotpoints. The time window contains virtually identical reflections, but different random noise. This alternative method must be used in place of the first preferred method if the random noise changes amplitude rapidly as a function of trace time.

The Fourier transforms of the two traces in the time window can be expressed as $$F_1 = \frac{1}{(1+RZ)^2}\beta + N_1 \quad (10)$$

and $$F_2 = \frac{1}{(1+RZ)^2}\beta + N_2 \quad (11)$$

where $F_1$=Fourier transform of the first trace, $N_1$=random noise in the first trace, $\beta$=desired reflections, without water column reverberations, $F_2$=Fourier transform of the second trace, and $N_2$=random noise in the second trace.

Applying the trial inverse Backus filters, Eqs. (10) and (11) become, respectively, $$F_1(1+\tilde{R}Z)^2 = \frac{(1+\tilde{R}Z)^2}{(1+RZ)^2}\beta + (1+\tilde{R}Z)^2 N_1 \quad (12)$$

and $$F_2(1+\tilde{R}Z)^2 = \frac{(1+\tilde{R}Z)^2}{(1+RZ)^2}\beta + (1+\tilde{R}Z)^2 N_2 \quad (13)$$

Forming the cross spectrum of Eq. (12) with Eq. (13) yields $$F_1 F_2^*(1+\tilde{R}Z)^2\{(1+\tilde{R}Z)^2\}^* = \frac{(1+\tilde{R}Z)^2}{(1+RZ)^2}\left\{\frac{(1+\tilde{R}Z)^2}{(1+RZ)^2}\right\}^* \beta\beta^* + \quad (14)$$

$$\frac{(1+\tilde{R}Z)^2\{(1+\tilde{R}Z)^2\}^*}{(1+RZ)^2}\beta N_2^* +$$

$$\frac{(1+\tilde{R}Z)^2\{(1+\tilde{R}Z)^2\}^*}{\{(1+RZ)^2\}^*}\beta^* N_1 +$$

$$(1+\tilde{R}Z)^2\{(1+\tilde{R}Z)^2\}^* N_1 N_2^*$$

In this method, we take advantage of the lack of coherence in all but the first term of Eq. (14). It can be seen in the last term of Eq. (14) that the noise signals on the two traces must be weakly correlated, as assumed, for the method to be effective.

For each value of $\tilde{R}$ used as a trial inverse Backus operator, the spectral components of Eq. (14) are vectorially summed. The magnitude of the resulting complex number is then computed. The value of $\tilde{R}$ that yields the smallest magnitude represents the best estimate for R.

Figure 3:
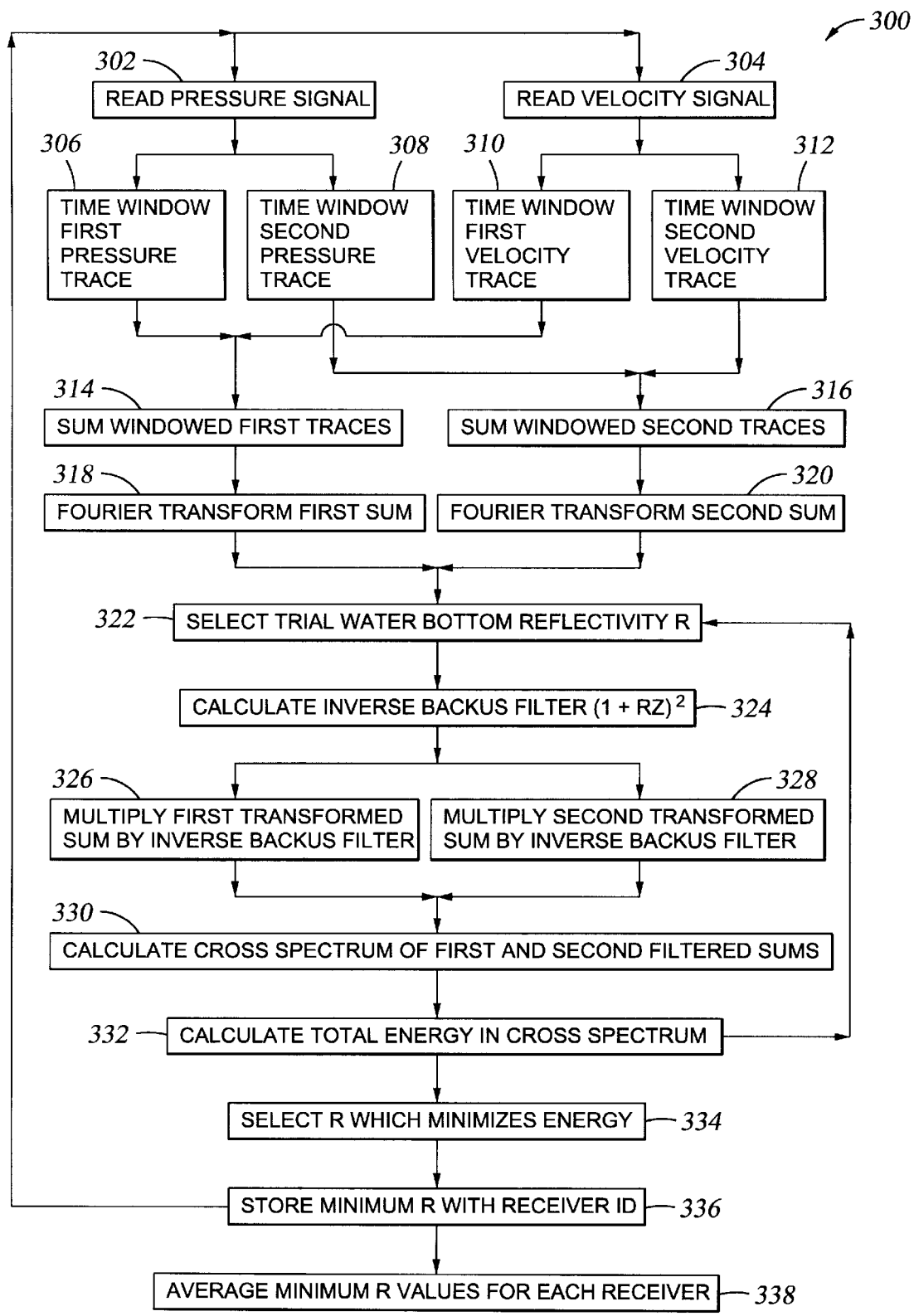
FIG. 3 is a flow diagram of the alternative implementation of the present invention in the presence of time-varying random noise.

FIG. 3 illustrates a flow diagram which represents the alternative embodiment of determining ocean bottom reflectivity in the presence of random noise which changes substantially over time. The alternative embodiment illustrated is generally designated by 300. First, in blocks 302 and 304, the pressure signal as a hydrophone data trace and the velocity signal as a geophone data trace from co-located receivers, are read. Next in blocks 306 and 310, a time window is applied to both the first pressure trace from block 302 and the first velocity trace from block 304, generating a windowed first pressure trace and a windowed first velocity trace, respectively. Preferably, the time window is selected as a period during which both signal and random noise exist. For example, the time window may be, counting from the first break appearing on each signal, in the range of 1000 to 2000 milliseconds. Next in blocks 308 and 312, the time window is applied to both the second pressure trace from block 302 and the second velocity trace from block 304, generating a windowed second pressure trace and a windowed second velocity trace, respectively. Next, in block 314, the windowed first pressure trace from block 306 and the windowed first velocity trace from block 310 are summed to generate a first summed signal. Similarly, in block 316, the windowed second pressure trace from block 308 and the windowed second velocity trace from block 312 are summed to generate a second summed signal. Then, in block 318, the first summed signal from block 314 is transformed from the time domain to the frequency domain, preferably by applying a Fourier transform to the first summed signal, generating a first transformed signal. Similarly, in block 320, the second summed signal from block 316 is transformed from the time domain to the frequency domain, preferably by applying a Fourier transform to the second summed signal, generating a second transformed signal.

Next, in blocks 322 a trial value $\tilde{R}$ for ocean bottom reflectivity is selected, preferably from a series of values defining an exhaustive search of the possible range of reflectivity values. In block 324, the trial inverse Backus filter $(1+Z\tilde{R})^2$ of Eq. (3) is computed for the selected ocean bottom reflectivity value $\tilde{R}$ from block 322, and for Z, the Z transform of the delay operator for the two-way travel time in the water layer. In block 326, the first transformed signal from Block 318 is multiplied by the trial inverse Backus filter from block 324, generating a first filtered signal. Similarly, in block 328, the second transformed signal from Block 320 is multiplied by the trial inverse Backus filter from block 324, generating a second filtered signal. Next, in block 330, the cross spectrum of the first filtered sum from block 326 and the second filtered sum from block 328 is calculated.

Next, an optimization algorithm is applied to the cross spectrum from block 330 to determine the best value of $\tilde{R}$. A preferred method of optimization is to minimize the total energy of the cross spectrum from block 330. In block 332, the total energy in the cross spectrum from block 330 is calculated by vectorially summing the spectral components of the cross spectrum. In block 334, the value of $\tilde{R}$ is determined which minimizes the total energy in the cross spectrum from block 330. In block 336, the value of $\tilde{R}$ from block 334 is stored along with the identification of the receiver. Then the program logic loops back to read the traces for the next receiver. Finally, in block 338, after traces for all the receiver locations are processed, the values of ocean bottom reflectivities $\tilde{R}$ are averaged.

The present invention has been described with a certain degree of specificity. Further variations will occur to those skilled in the art which are within the scope of the invention.

We claim:

1. A method for determining ocean bottom reflectivities from dual sensor seismic data, comprising the steps of:

summing a first time windowed pressure signal and a first time windowed velocity signal to generate a first summed signal, and summing a second time windowed pressure signal and a second time windowed velocity signal to generate a second summed signal;

transforming said first summed signal and said second summed signal from a time domain to a frequency domain, generating a first transformed sum and a second transformed sum, respectively;

selecting a trial value $\tilde{R}$ for said ocean bottom reflectivity;

calculating a trial inverse Backus filter $(1+\tilde{R}Z)^2$ for said selected trial ocean bottom reflectivity $\tilde{R}$, where Z is a Z-transforn of two-way travel time delay filter;

multiplying said first transformed sum and said second transformed sum by said trial inverse Backus filter, generating a first filtered sum and a second filtered sum, respectively;

calculatuig a cross spectrum from said first filtered sum and said second filtered sum, generating a trial cross spectrum to substantially remove effects of random noise; and applying an optimization algorithm to said trial cross spectrum to determine said ocean bottom reflectivity.

2. The method of claim 1, wherein said applying an optimization algorithm step comprises the steps of:

calculating total energy of said trial cross spectrum;

repeating said calculating steps, using different values for said ocean bottom reflectivity $\tilde{R}$; and determining the value for said ocean bottom reflectivity $\tilde{R}$ which yield the lowest value for said energy.

3. The method of claim 2, wherein said determining lowest value step is accomplished using an exhaustive search.

4. The method of claim 3, further comprising the step of:

averaging said determined values $\tilde{R}$ for said ocean bottom reflectivity at each receiver position.

5. The method of claim 1, wherein said summing step comprises the steps of:

applying a first time window to a pressure signal and a velocity signal, generating a first windowed pressure signal and a first windowed velocity signal, respectively;

summing said first windowed pressure signal and first windowed velocity signal to generate said first summed signal;

applying a second time window to said pressure signal and said velocity signal, generating a second-windowed pressure signal and a second-windowed velocity signal, respectively; and summing said second-windowed pressure signal and second-windowed velocity signal to generate a second summed signal.

6. The method of claim 5, wherein said first time window is selected as a period during which both signal and random noise exist and said second time window is selected as a period during which random noise dominates the signal.

7. The method of claim 6, wherein said calculating a cross spectrum step comprises the steps of:

calculating cross spectrums of said first filtered sum and of said second filtered sum, generating a first cross spectrum and a second cross spectrum, respectively; and subtracting said second cross spectrum from said first cross spectrum, generating said trial cross spectrum.

8. The method of claim 1, wherein said summing step comprises the steps of:

applying a time window to a first pressure trace and a first velocity trace, generating a windowed first pressure trace and a windowed first velocity trace, respectively;

summing said windowed first pressure trace and windowed first velocity trace to generate a first summed signal;

applying said time window to a second pressure trace and a second velocity trace, generating a windowed second pressure trace and a windowed second velocity trace, respectively; and summing said windowed second pressure trace and windowed second velocity trace to generate a second summed signal.

9. The method of claim 8, wherein said calculating a cross spectrum step comprises the step of:

calculating a cross spectrum of said first filtered sum with said second filtered sum, generating said trial cross spectrum.

10. The method of claim 2, wherein said calculating total energy step comprises the step of:

summing algebraically spectral components of said trial cross spectrum.

11. The method of claim 2, wherein said calculating total energy step comprises the step of:

summing vectorially spectral components of said trial cross spectrum.

12. A method for determining ocean bottom reflectivities from dual sensor seismic data, comprising the steps of:

applying a first time window in which both signal and noise exist to a pressure signal and a velocity signal, generating a first-windowed pressure signal and a first-windowed velocity signal, respectively;

summing said first-windowed pressure signal and first-windowed velocity signal to generate said first summed signal;

applying a second time window in which noise dominates to said pressure signal and said velocity signal, generating a second-windowved pressure signal and a second-windowed velocity signal, respectively;

summing said second-windowed pressure signal and second-windowed velocity signal to generate a second summed signal;

transforming said first summed signal and said second summed signal from a time domain to a frequency domain, generating a first transformed sum and a second transformed sum, respectively;

selecting a trial value $\tilde{R}$ for said ocean bottom reflectivity;

calculating a trial inverse Backus filter $(1+\tilde{R}Z)^2$ for said selected trial ocean bottom reflectivity $\tilde{R}$, where Z is a Z-transform of two-way travel time delay filter;

multiplying said first transformed sum and said second transformed sum by said trial inverse Backus filter, generating a first filtered sum and a second filtered sum, respectively;

calculating a cross spectrum from said first filtered sum and said second filtered sum, generating a trial cross spectrum to substantially remove effects of random noise; and applying an optimization algorithm to said trial cross spectrum to determine said ocean bottom reflectivity.

13. A method for determining ocean bottom reflectivities from dual sensor seismic data, comprising the steps of:

applying a first time window in which both signal and noise exist to a pressure signal and a velocity signal, generating a first-windowed pressure signal and a first-windowed velocity signal, respectively;

summing said first-windowed pressure signal and first-windowed velocity signal to generate said first summed signal;

applying a second time window in which noise dominates to said pressure signal and said velocity signal, generating a second-windowed pressure signal and a second-windowed velocity signal, respectively;

summing said second-windowed pressure signal and second-windowed velocity signal to generate a second summed signal;

transforming said first summed signal and said second summed signal from a time domain to a frequency domain, generating a first transformed sum and a second transformed sum, respectively;

selecting a trial value $\tilde{R}$ for said ocean bottom reflectivity;

calculating a trial inverse Backus filter $(1+\tilde{R}Z)^2$ for said selected trial ocean bottom reflectivity $\tilde{R}$; where Z is a Z-transform of two-way travel time delay filter;

multiplying said first transformed sum and said second transformed sum by said trial inverse Backus filter, generating a first filtered sum and a second filtered sum, respectively;

calculating cross spectrums of said first filtered sum and of said second filtered sum, generating a first cross spectrum and a second cross spectrum, respectively;

subtracting said second cross spectrum from said first cross spectrum, generating said trial cross spectrum; and applying an optimization algorithm to said trial cross spectrum to determine said ocean bottom reflectivity.

14. A method for determining ocean bottom reflectivities from dual sensor seismic data, comprising the steps of:

applying a time window to a first pressure trace and a first velocity trace, generating a windowed first pressure trace and a windowed first velocity trace, respectively;

summing said windowed first pressure trace and windowed first velocity trace to generate a first summed signal;

applying said time window to a second pressure trace and a second velocity trace, generating a windowed second pressure trace and a windowed second velocity trace, respectively;

summing said windowed second pressure trace and windowed second velocity trace to generate a second summed signal;

transforming said first summed signal and said second summed signal from a time domain to a frequency domain, generating a first transformed sum and a second transformed sum, respectively;

selecting a trial value $\tilde{R}$ for said ocean bottom reflectivity;

calculating a trial inverse Backus filter $(1+\tilde{R}Z)^2$ for said selected trial ocean bottom reflectivity $\tilde{R}$, where Z is a Z-transform of two-way travel time delay filter;

multiplying said first transformed sum and said second transformed sum by said trial inverse Backus filter, generating a first filtered sum and a second filtered sum, respectively;

calculating a cross spectrum of said first filtered sum with said second filtered sum, generating a trial cross spectrum; and applying an optimization algorithm to said trial cross spectrum to determine said ocean bottom reflectivity.

* * * * *